United States Patent
Jiang et al.

(10) Patent No.: US 11,868,562 B2
(45) Date of Patent: Jan. 9, 2024

(54) DISPLAY PANEL, MANUFACTURING METHOD, DISPLAY DEVICE AND TOUCH SIGNAL PROCESSING METHOD

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Yichen Jiang, Beijing (CN); Jianjun Wu, Beijing (CN); Hongqiang Luo, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 117 days.

(21) Appl. No.: 17/413,332

(22) PCT Filed: Jan. 19, 2021

(86) PCT No.: PCT/CN2021/072687
§ 371 (c)(1),
(2) Date: Jun. 11, 2021

(87) PCT Pub. No.: WO2021/147853
PCT Pub. Date: Jul. 29, 2021

(65) Prior Publication Data
US 2022/0317802 A1     Oct. 6, 2022

(30) Foreign Application Priority Data
Jan. 20, 2020   (CN) .......................... 202010064651.2

(51) Int. Cl.
*G06F 3/041*   (2006.01)
*G06F 3/044*   (2006.01)

(52) U.S. Cl.
CPC .......... *G06F 3/0418* (2013.01); *G06F 3/0412* (2013.01); *G06F 3/0446* (2019.05);
(Continued)

(58) Field of Classification Search
CPC .... G06F 3/0418; G06F 3/0412; G06F 3/0446; G06F 2203/04103; G06F 2203/04111;
(Continued)

(56) References Cited

U.S. PATENT DOCUMENTS

2010/0271319 A1   10/2010   Goo et al.
2016/0378265 A1   12/2016   Katsurahira et al.
(Continued)

FOREIGN PATENT DOCUMENTS

CN   102478984 A   5/2012
CN   104793799 A   7/2015
(Continued)

OTHER PUBLICATIONS

International Search Report and Written Opinion for Application No. PCT/CN2021/072687, dated Apr. 16, 2021, 10 Pages.
(Continued)

*Primary Examiner* — Md Saiful A Siddiqui
(74) *Attorney, Agent, or Firm* — BROOKS KUSHMAN P.C.

(57) ABSTRACT

A display panel, a display device and a touch signal processing method. The display panel includes a base substrate, a touch sensor arranged on the base substrate and including a plurality of touch sub-electrodes, and a signal noise sensor configured to detect a signal noise from the display panel and including a plurality of detection electrodes. An outer
(Continued)

contour of at least one detection electrode is located within an outer contour of at least one touch sub-electrode.

11 Claims, 6 Drawing Sheets

(52) U.S. Cl.
CPC .............. *G06F 2203/04103* (2013.01); *G06F 2203/04111* (2013.01)

(58) Field of Classification Search
CPC ... G06F 3/0443; G06F 3/0448; G06F 3/04182
See application file for complete search history.

(56) References Cited

U.S. PATENT DOCUMENTS

| | | | |
|---|---|---|---|
| 2017/0017343 A1 | 1/2017 | Chen et al. | |
| 2017/0068838 A1 | 3/2017 | Kravets et al. | |
| 2017/0153731 A1* | 6/2017 | Liu | ........................ G06F 3/0443 |
| 2017/0336910 A1 | 11/2017 | Han et al. | |
| 2018/0136784 A1 | 5/2018 | Liu et al. | |
| 2018/0321793 A1* | 11/2018 | Kim | ........................ G06F 3/0418 |
| 2018/0329555 A1* | 11/2018 | Kim | ........................ G06F 3/044 |
| 2018/0329576 A1* | 11/2018 | Kim | ........................ G06F 3/0446 |
| 2019/0079633 A1 | 3/2019 | Kim et al. | |
| 2019/0102015 A1* | 4/2019 | Kim | ........................ H01L 27/323 |
| 2019/0384455 A1 | 12/2019 | Kameda et al. | |
| 2020/0110484 A1* | 4/2020 | Kim | ........................ G06F 3/044 |
| 2020/0142563 A1* | 5/2020 | Kim | ........................ G06F 3/0418 |

FOREIGN PATENT DOCUMENTS

| | | |
|---|---|---|
| CN | 105094475 A | 11/2015 |
| CN | 107924260 A | 4/2018 |
| CN | 108803921 A | 11/2018 |
| CN | 108874209 A | 11/2018 |
| CN | 109471550 A | 3/2019 |
| CN | 110609634 A | 12/2019 |
| EP | 3570151 A1 | 11/2019 |
| KR | 20080039121 A | 5/2008 |
| KR | 20100116449 A | 11/2010 |
| WO | 2015141349 A1 | 9/2015 |

OTHER PUBLICATIONS

First Office Action for Chinese Application No. 202010064651.2, dated Nov. 30, 2022, 9 Pages.
Extended European Search Report for Application No. 21719524.7-1224, dated Jun. 15, 2023, 10 Pages.

* cited by examiner

DISPLAY PANEL, MANUFACTURING METHOD, DISPLAY DEVICE AND TOUCH SIGNAL PROCESSING METHOD

CROSS-REFERENCE TO RELATED APPLICATION APPLICATIONS

This application is the U.S. national phase of PCT Application No. PCT/CN2021/072687 filed on Jan. 19, 2021, which claims priority to Chinese Patent Application No. 202010064651.2 filed on Jan. 20, 2020, which are incorporated herein by reference in their entireties.

TECHNICAL FIELD

The present disclosure relates to the field of display technology, in particular to a display panel, a display device and a touch signal processing method.

BACKGROUND

In the related art, most electronic devices such as mobile phones and tablet computers are each provided with a display panel having a touch function. A touch sensor is integrated with a pixel unit of the display panel to reduce a thickness of the display panel, and usually this kind of display panel is called as a touch-in-cell or in-cell display panel.

However, due to a high integration level, the touch sensor is arranged too close to the other structures. In use, varying current signals are generated by the display panel, and the touch sensor may collect these signals while collecting a touch signal, thereby accuracy of the touch signal may be adversely affected to some extent.

SUMMARY

An object of the present disclosure is to provide a display panel, a display device and a touch signal processing method, so as to solve the problem in the related art where the accuracy of the touch signal is relatively low.

In order to solve the above technical problems, the present disclosure is implemented as follows.

In one aspect, the present disclosure provides in some embodiments a display panel, including a base substrate, a touch sensor arranged on the base substrate and including a plurality of touch sub-electrodes, and a signal noise sensor configured to detect a signal noise from the display panel and including a plurality of detection electrodes. An outer contour of at least one detection electrode is located within an outer contour of at least one touch sub-electrode.

In a possible embodiment of the present disclosure, the plurality of detection electrodes is arranged at a same layer as, and electrically insulated from, the plurality of touch sub-electrodes.

In a possible embodiment of the present disclosure, the plurality of detection electrodes is arranged at a layer different from, and electrically insulated from, the plurality of touch sub-electrodes.

In a possible embodiment of the present disclosure, all or a part of the plurality of detection electrodes are electrically connected to each other.

In a possible embodiment of the present disclosure, when a part of the plurality of detection electrodes are electrically connected to each other, the plurality of detection electrodes is arranged in at least one region, the detection electrodes in each region are electrically connected to each other, and a coverage area of each region is smaller than a coverage area of the plurality of detection electrodes.

In a possible embodiment of the present disclosure, the display panel further includes a plurality of dummy patterns arranged at a same layer as, and made of a same material as, the plurality of detection electrodes, the plurality of dummy patterns is electrically insulated from each other, and each dummy pattern is electrically insulated from the detection electrodes.

In a possible embodiment of the present disclosure, the detection electrodes are electrically connected to each other through bridging lines, and the bridging lines are arranged at a same layer as, and made of a same material as, the detection electrodes.

In a possible embodiment of the present disclosure, each touch sub-electrode includes a receiving electrode and a transmitting electrode.

In a possible embodiment of the present disclosure, an extension direction of each bridging line crosses an arrangement direction of the receiving electrode and the transmitting electrode.

In a possible embodiment of the present disclosure, the display panel further includes a noise detection signal line, one end of the noise detection signal line is electrically connected to the plurality of detection electrodes and the other end of the noise detection signal line is connected to a touch control chip.

In another aspect, the present disclosure provides in some embodiments a display device including the above-mentioned display panel.

In a possible embodiment of the present disclosure, the display device further includes a touch control chip, the touch sensor and the signal noise sensor are electrically connected to the touch control chip, and the touch control chip is configured to perform noise reduction on a detection result of the touch sensor in accordance with a signal noise detected by the signal noise sensor.

In yet another aspect, the present disclosure provides in some embodiments a method for manufacturing a display panel, including: providing a base substrate; forming a signal noise sensor on the base substrate, the signal noise sensor being configured to detect a signal noise from the display panel; and forming a touch sensor on a same layer as the signal noise sensor, or forming a touch sensor on a side of the signal noise sensor away from the base substrate.

In a possible embodiment of the present disclosure, the display panel includes a plurality of dummy patterns, the signal noise sensor includes a plurality of detection electrodes, and the forming the signal noise sensor on the base substrate includes forming the plurality of dummy patterns and the plurality of detection electrodes through a single patterning process.

In still yet another aspect, the present disclosure provides in some embodiments a method for manufacturing a display panel, including: providing a base substrate; forming a touch sensor on the base substrate; and forming a signal noise sensor on a side of the touch sensor away from the base substrate. The signal noise sensor is configured to detect a signal noise from the display panel.

In a possible embodiment of the present disclosure, the display panel includes a plurality of dummy electrodes, the signal noise sensor includes a plurality of detection electrodes, and the forming the signal noise sensor on the side of the touch sensor away from the base substrate includes forming the plurality of dummy patterns and the plurality of detection electrodes through a single patterning process.

In still yet another aspect, the present disclosure provides in some embodiments a touch signal processing method for the above-mentioned display device, including: acquiring a touch signal collected by a touch sensor and a signal noise collected by a signal noise sensor; and performing noise reduction on the touch signal in accordance with the signal noise.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

The present disclosure provides in some embodiments a display panel.

In a possible embodiment of the present disclosure, the display panel includes a base substrate, a plurality of pixel units, and a touch sensor arranged on the base substrate. Specific structures of the base substrate and the plurality of pixel units may refer to those in the related art, and thus will not be particularly defined herein.

Figure 1:
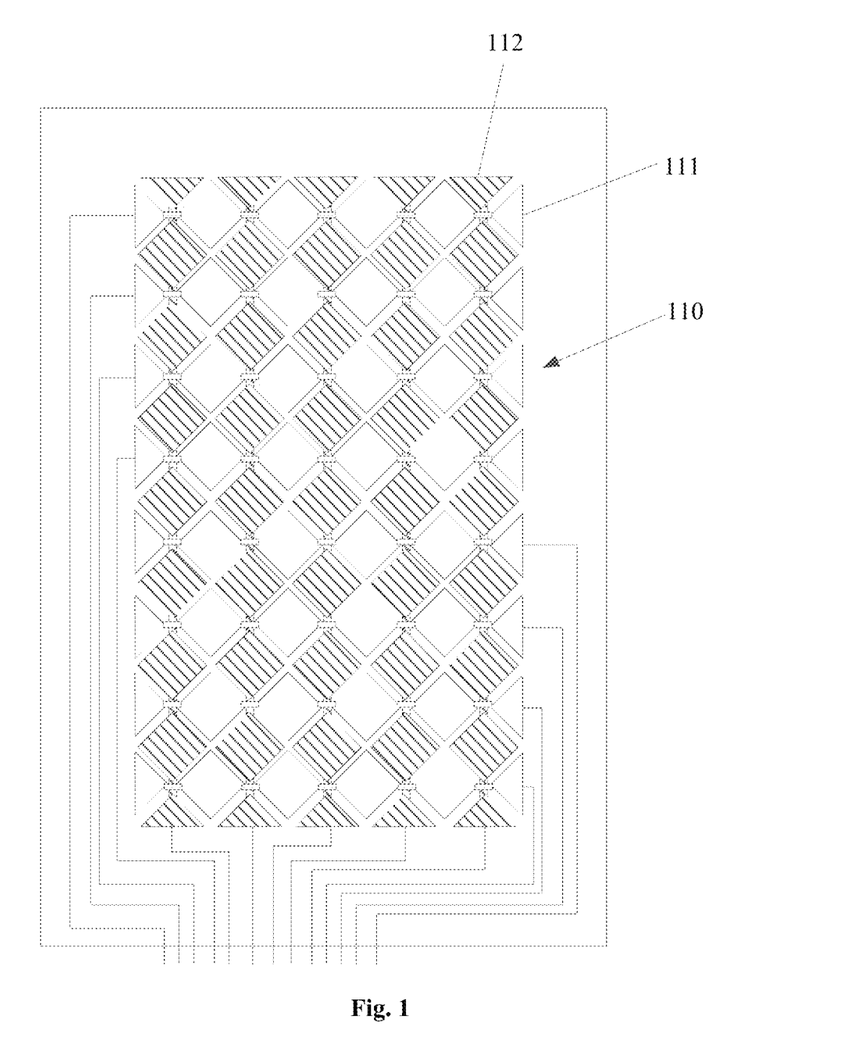
FIG. 1 is a schematic view of a display panel according to one embodiment of the present disclosure.

As shown in FIG. 1, in a possible embodiment of the present disclosure, the touch sensor 110 includes a plurality of receiving electrodes (Rx) 111 and a plurality of transmitting electrodes (Tx) 112, which are collectively referred to as touch sub-electrodes.

In the embodiments of the present disclosure, the plurality of receiving electrodes 111 may be arranged horizontally, and the plurality of transmitting electrodes 112 may be arranged longitudinally. The receiving electrodes 111 in each row may be electrically connected to each other, and electrically connected to a data line. The transmitting electrodes 112 in each column may be electrically connected to each other, and electrically connected to a data line. The plurality of receiving electrodes 111 may be electrically insulated from the plurality of transmitting electrodes 112.

Apparently, in some other embodiments of the present disclosure, a structure of the touch sensor 110 may be adjusted accordingly, which will not be particularly defined herein.

Figure 2:
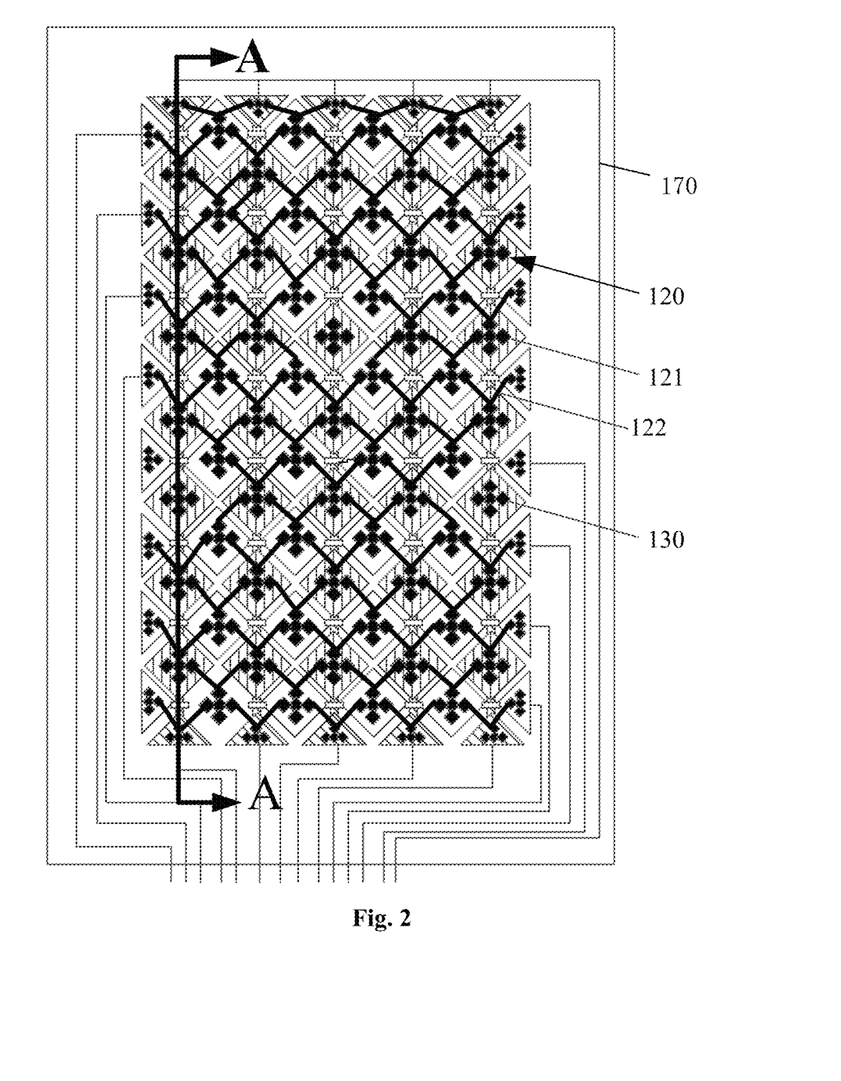
FIG. 2 is another schematic view of the display panel according to one embodiment of the present disclosure.

FIG. 2 is another schematic view of the display panel according to one embodiment of the present disclosure.

As shown in FIG. 2, the display panel may further include a signal noise sensor 120 mainly configured to detect a signal noise generated by the display panel in a scanning operation.

The signal noise detected by the signal noise sensor 120 may be substantially the same as a signal noise transmitted to the touch sensor 110. In this regard, the signal noise detected by the signal noise sensor 120 may be considered as a signal noise that affects a detection result of the touch sensor 110. Hence, the noise reduction may be performed on the detection result of the touch sensor 110 in accordance with the detection result detected by the signal noise sensor 120, so as to increase a signal-to-noise ratio of a touch signal, thereby to improve quality of the touch signal.

In the embodiments of the present disclosure, the signal noise generated by the display panel during the scanning operation may be collected by the signal noise sensor 120 to perform the noise reduction on the collected touch signal. As a result, it is able to determine the signal noise accurately, and perform the noise reduction in a targeted manner, thereby to improve the accuracy of the touch signal.

In a possible embodiment of the present disclosure, the signal noise sensor 120 may include a plurality of detection electrodes 121, and all or a part of the plurality of detection electrodes may be electrically connected to each other.

For example, the plurality of detection electrodes 121 may be arranged in several regions, and the detection electrodes 121 in each region may be electrically connected to each other, so as to collect the signal noise in a corresponding region in a targeted manner, thereby to improve the accuracy of the signal noise. A coverage area of each region may be smaller than a coverage area of the plurality of detection electrodes.

In another possible embodiment of the present disclosure, all the detection electrodes 121 may be electrically connected to each other. In this way, all the detection electrodes 121 may output the collected signal noise through a same connection line, or through a plurality of connection lines connected in parallel to each other, so as to improve the output stability of the signal noise.

A distribution region of the plurality of detection electrodes 121 may be the same as a distribution region of the touch sensor 110 to improve the detection accuracy of the signal noise that may probably affect the touch sensor 110.

All the detection electrodes 121 may be electrically connected to each other, so as to increase a detection range of the signal noise sensor 120, thereby to improve the detection accuracy of the signal noise.

In a possible embodiment of the present disclosure, the display panel may further include a plurality of dummy patterns 130 arranged at a same layer as, and made of a same material as, the plurality of detection electrodes 121. The plurality of dummy patterns 130 may be electrically insulated from each other, and each dummy pattern 130 may be electrically insulated from the detection electrodes 121.

In the embodiments of the present disclosure, a specific structure and function of the dummy pattern 130 may refer to those known in the related art, and thus will not be particularly defined herein. A main difference lies in that, in the embodiments of the present disclosure, part or all of patterns formed during the manufacture of the plurality of dummy patterns 130 serve as electrodes of the signal noise sensor 120.

As shown in FIG. 2, it should be appreciated that, in the patterns formed during the manufacture of the plurality of dummy patterns 130, a part of the patterns not electrically connected to the other structures may still serve as the dummy patterns 130 with functions known in the related art, and a part of the patterns electrically connected to the other structures and outputting a signal via the data line may serve as the detection electrodes 121 of the signal noise sensor 120.

In other words, the plurality of dummy patterns 130 may be arranged at a same layer, and made of a same material, as the plurality of detection electrodes 121. In this way, the plurality of dummy patterns 130 and the plurality of detection electrodes 121 may be formed through a single patterning process, as long as a shape of a mask is changed in an exposing process. As compared with the related art, in the embodiments of the present disclosure, it is able to manufacture the signal noise sensor 120 without any significant increase in the cost.

Further, the detection electrodes 121 may be electrically connected to each other through bridging lines 122, and the bridging lines 122 may be arranged at a same layer, and made of a same material, as the detection electrodes 121.

In a possible embodiment of the present disclosure, the bridging lines 122 connecting the detection electrodes 121 may be separately formed, and in another possible embodiment of the present disclosure, the bridging lines 122 may be arranged at a same layer, and made of a same material, as the detection electrodes 121.

In a possible embodiment of the present disclosure, an extension direction of each bridging line 122 may cross an arrangement direction of the receiving electrode 111 and the transmitting electrode 112.

Figure 3:
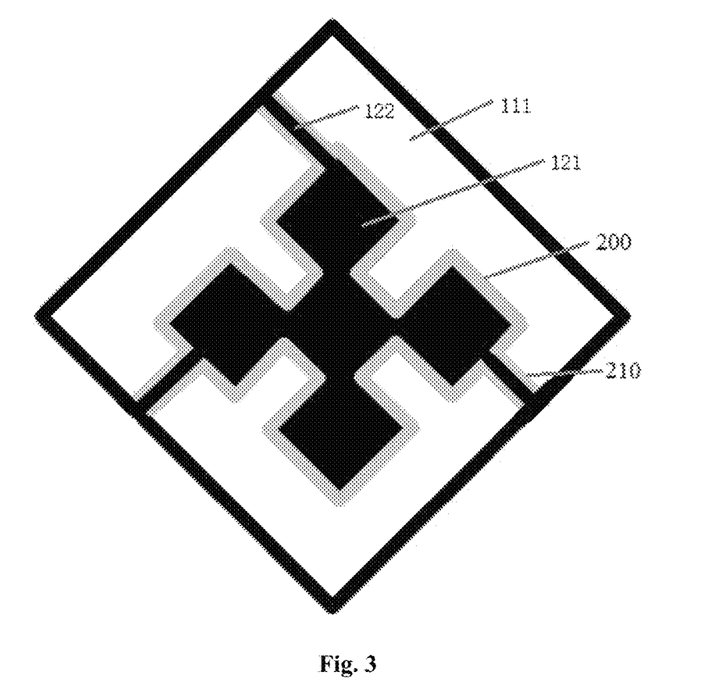
FIG. 3 is a partially enlarged view of the display panel according to one embodiment of the present disclosure.

FIG. 3 is a partially enlarged view of the display panel according to one embodiment of the present disclosure. As shown in FIG. 3, when the detection electrode 121 is embedded in the receiving electrode 111, there is a first gap 200 between the detection electrode 121 and the receiving electrode 111, so as to insulate the detecting electrode 121 from the receiving electrode 111, and there is a second gap 210 between the bridging line 122 and the receiving electrode 111 to electrically insulate the bridging line 122 from the receiving electrode 111. A size of the first gap 200 and a size of the second gap 210 may be the same or different from each other. The partially enlarged view of FIG. 3 may correspond to FIG. 4.

Figure 4:
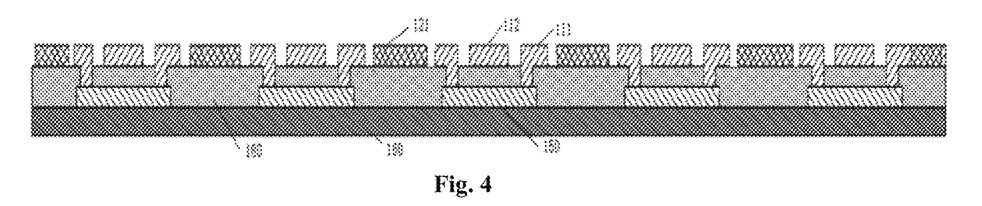
FIG. 4 is a schematic view showing a position relationship between detection electrodes and touch sub-electrodes according to one embodiment of the present disclosure.

FIG. 4 is a schematic view showing a position relationship between the detection electrodes and the touch sub-electrodes according to one embodiment of the present disclosure. As shown in FIG. 4, the plurality of detection electrodes may be arranged at a same layer as, and electrically insulated from, the plurality of touch sub-electrodes. An outer contour of each detection electrode may be located within an outer contour of the receiving electrode 111, and there is a gap between the detecting electrode 121 and the receiving electrode 111. The receiving electrodes 111 may be electrically connected to each other through bridging electrodes 150. Each bridge electrode 150 may be located on a film layer 160 consisting of a thin film encapsulation (TFE) layer and a buffer layer. A first insulating layer 180 is configured to insulate the receiving electrode 111 from the transmitting electrode 112 and to insulate the transmitting electrode 112 from the bridging electrode 150.

It should be appreciated that, the transmitting electrodes 112 may also be connected to each other through the bridging electrodes 150, i.e., the receiving electrodes or the transmitting electrodes may be connected to each other through the bridging electrodes. In addition, each bridge electrode may be located on the corresponding receiving electrode 111 or the corresponding transmitting electrode 112, or under the corresponding receiving electrode 111 or the corresponding transmitting electrode 112.

Figure 5:
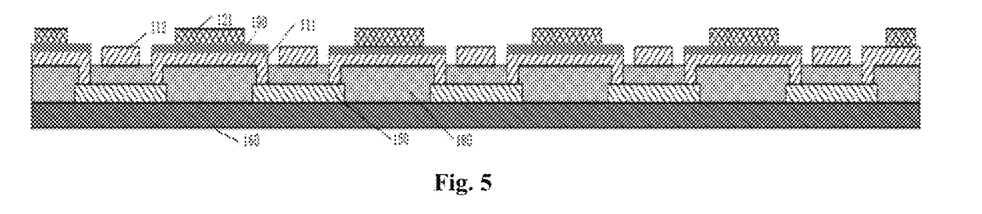
FIG. 5 is another schematic view showing the position relationship between the detection electrodes and the touch sub-electrodes according to one embodiment of the present disclosure.

FIG. 5 is another schematic view showing the position relationship between the detection electrodes and the touch sub-electrodes according to one embodiment of the present disclosure. As shown in FIG. 5, the plurality of detection electrodes may be arranged at a layer different from, and electrically insulated from, the plurality of touch sub-electrodes. Each detection electrode 121 may be located on the corresponding receiving electrode 111, and a second insulating layer 190 may be arranged between the detection electrode 121 and the receiving electrode 111. The plurality of receiving electrodes 111 may be connected to each other through the plurality of bridging electrodes 150. The plurality of bridging electrodes 150 may be located on the film layer 160 consisting of a TFE layer and a buffer layer. The first insulating layer 180 is configured to insulate the receiving electrode 111 from the transmitting electrode 112 and to insulate the transmitting electrode 112 from the bridging electrode 150.

Figure 6:
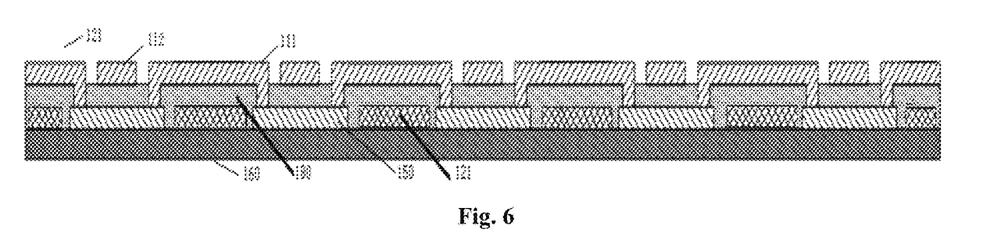
FIG. 6 is yet another schematic view showing the position relationship between the detection electrodes and the touch sub-electrodes according to one embodiment of the present disclosure.

FIG. 6 is yet another schematic view showing the position relationship between the detection electrodes and the touch sub-electrodes according to one embodiment of the present disclosure. As shown in FIG. 6, the plurality of detection electrodes may be arranged at a layer different from, and electrically insulated from, the plurality of touch sub-electrodes. The plurality of detection electrodes 121 may be arranged at a same layer as the plurality of bridging electrodes 150. The plurality of receiving electrodes 111 may be connected to each other through the plurality of bridging electrodes 150. The plurality of bridging electrodes 150 and the detection electrodes 121 may be located on the film layer 160 consisting of a thin film encapsulation (TFE) layer and a buffer layer. The first insulating layer 180 is configured to insulate the receiving electrode 111 from the transmitting electrode 112 and to insulate the transmitting electrode 112 from the bridging electrode 150.

All or a part of the plurality of detection electrodes 121 may be electrically connected to each other, and connected to connection lines. The detected signal noise may be transmitted through a corresponding connection line.

In a possible embodiment of the present disclosure, the display panel may include a noise detection signal line 170, one end of which is electrically connected to the plurality of detection electrodes 121 and the other end of which is connected to a touch control chip 140.

It should be appreciated that, the dummy patterns 130, the detection electrodes 121 and the bridging lines 122 may be manufactured through a single exposing and developing process (also called as single masking process). In this way, only a shape of the mask needs to be adjusted, and the other processes and steps may refer to those in the related art during the manufacture. As compared with the related art, it is able to manufacture the display panel with the plurality of detection electrodes 121 and the plurality of bridging lines 122 without any significant increase in the cost.

The touch sensor may include the plurality of receiving electrodes 111 and the plurality of transmitting electrodes 112, and the detection electrodes 121 may be arranged in such a manner as to correspond to the receiving electrodes 111 or the transmitting electrodes 112 respectively, so as to detect the signal noise that may probably be received at the corresponding receiving electrode 111 or transmitting electrode 112 in a more accurate manner, thereby to improve the detection accuracy of the signal noise.

In the embodiments of the present disclosure, the signal noise sensor may collect the signal noise generated by the display panel during the scanning operation, so as to perform the noise reduction on the collected touch signal in accordance with the detection result. As a result, it is able to determine the signal noise accurately, thereby to perform the noise reduction in a targeted manner, and improve the accuracy of the touch signal.

The present disclosure further provides in some embodiments a display device including the above-mentioned display panel.

The implementation of the display device may refer to that of the display panel mentioned hereinabove with a same technical effect, and thus will not be particularly defined herein.

Figure 10:
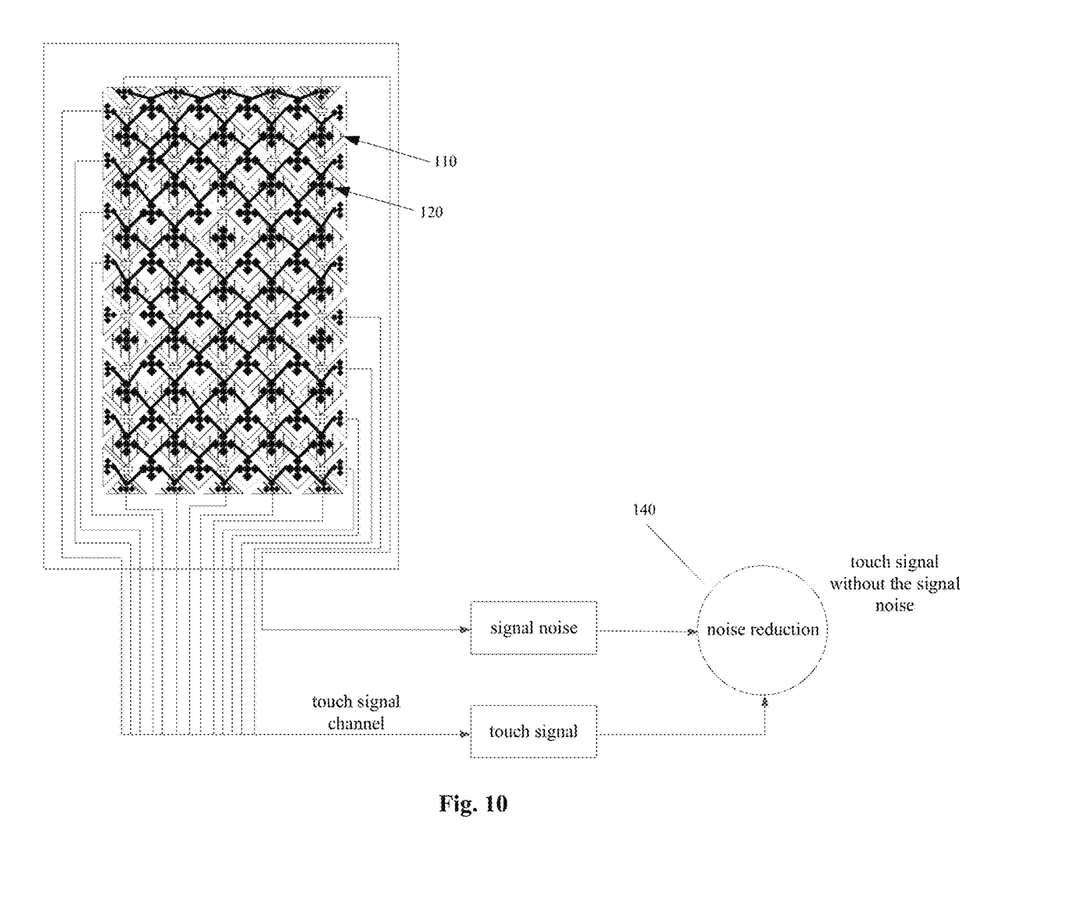
FIG. 10 is a schematic view showing the processing of a touch signal according to one embodiment of the present disclosure.

In a possible embodiment of the present disclosure, as shown in FIG. 10, the display device may further include a touch control chip 140, and the touch sensor and the signal noise sensor 120 may be electrically connected to the touch control chip 140. The touch control chip 140 is configured to perform noise reduction on a detection result of the touch sensor in accordance with the signal noise detected by the signal noise sensor 120 during a scanning operation.

The touch control chip 140 may refer to that in the related art. Different from that in the related art, the touch control chip 140 in the embodiments of the present disclosure may be further connected to the signal noise sensor 120 to acquire the signal noise detected by the signal noise sensor 120. In this way, during the signal processing, the noise reduction may be performed on the detection result of the touch sensor merely through adjusting a signal processing algorithm, without any additional hardware cost.

The present disclosure further provides in some embodiments a method for manufacturing a display panel.

Figure 7:
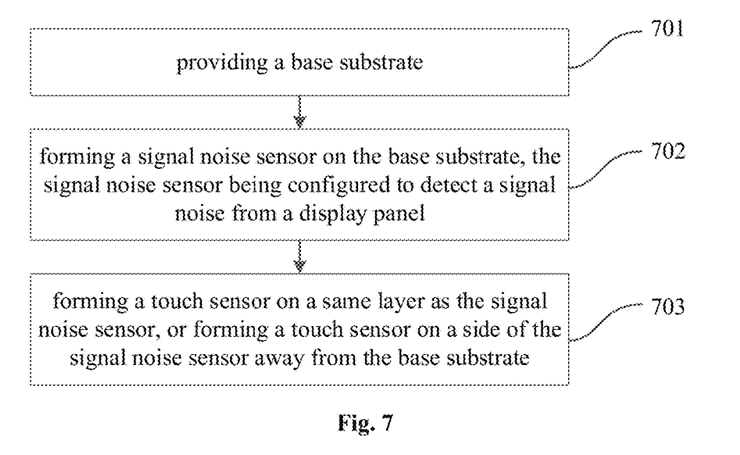
FIG. 7 is a flow chart of a method for manufacturing the display panel according to one embodiment of the present disclosure.

As shown in FIG. 7, the method includes: Step 701 of providing a base substrate; Step 702 of forming a signal noise sensor on the base substrate, the signal noise sensor being configured to detect a signal noise from the display panel; and Step 703 of forming a touch sensor on a same layer as the signal noise sensor, or forming a touch sensor on a side of the signal noise sensor away from the base substrate.

In the embodiments of the present disclosure, the manufacture of the base substrate and the touch sensor may refer to that in the related art, and thus will not be particularly defined herein.

In the embodiments of the present disclosure, prior to forming the touch sensor, the method may also include forming the signal noise sensor.

In a possible embodiment of the present disclosure, the display panel may include a plurality of dummy patterns, and the signal noise sensor may include a plurality of detection electrodes. The forming the signal noise sensor on the base substrate may include forming the plurality of dummy patterns and the plurality of detection electrodes through a single patterning process. If necessary, a plurality of bridging lines connecting the plurality of detection electrodes may also be formed through a single patterning process.

It should be appreciated that, in the embodiments of the present disclosure, the dummy patterns, the detection electrodes and the bridging lines may be manufactured through a single masking process. In this way, only a shape of the mask needs to be adjusted, and the other processes and steps may refer to those in the related art during the manufacture. As compared with the related art, it is able to manufacture the display panel with the plurality of detection electrodes and the plurality of bridging lines without any significant increase in the cost.

The present disclosure further provides in some embodiments another method for manufacturing a display panel.

Figure 8:
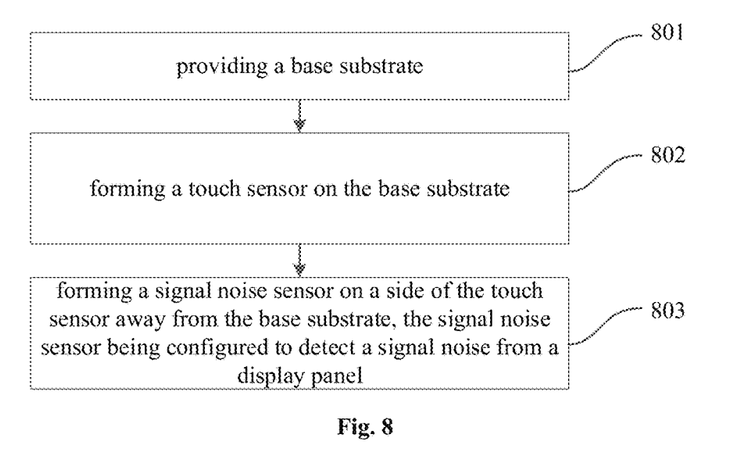
FIG. 8 is another flow chart of the method for manufacturing the display panel according to one embodiment of the present disclosure.

As shown in FIG. 8, the method includes: Step 801 of providing a base substrate; Step 802 of forming a touch sensor on the base substrate; and Step 803 of forming a signal noise sensor on a side of the touch sensor away from the base substrate, the signal noise sensor being configured to detect a signal noise from the display panel.

In the embodiments of the present disclosure, the manufacture of the base substrate and the touch sensor may refer to that in the related art, and thus will not be particularly defined herein.

In a possible embodiment of the present disclosure, the display panel may include a plurality of dummy patterns, and the signal noise sensor may include a plurality of detection electrodes. The forming the signal noise sensor on the side of the touch sensor away from the base substrate may include forming the plurality of dummy patterns and the plurality of detection electrodes through a single patterning process.

The present disclosure further provides in some embodiments a touch signal processing method for the above-mentioned display device.

Figure 9:
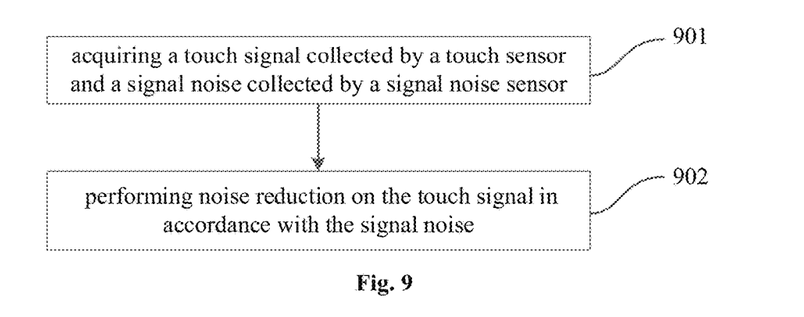
FIG. 9 is a flow chart of a touch signal processing method according to one embodiment of the present disclosure.

As shown in FIG. 9, the touch signal processing method includes: Step 901 of acquiring a touch signal collected by a touch sensor and a signal noise collected by a signal noise sensor; and Step 902 of performing noise reduction on the touch signal in accordance with the signal noise.

As shown in FIG. 10, in use, the touch signal may be collected by the touch sensor 110, the signal noise may be collected by the signal noise sensor 120, and then the collected touch signal and the collected signal noise may be input to the touch control chip 140 to perform noise reduction, so as to acquire the touch signal without the signal noise being reduced.

The signal noise detected by the signal noise sensor 120 may be substantially the same as a signal noise transmitted to the touch sensor 110. In this regard, the signal noise detected by the signal noise sensor 120 may be considered as a signal noise that affects a detection result of the touch sensor 110. Hence, the noise reduction may be performed on the detection result of the touch sensor 110 in accordance with the detection result detected by the signal noise sensor 120, so as to increase a signal-to-noise ratio of the touch signal, thereby to improve quality of the touch signal.

Figure 11:
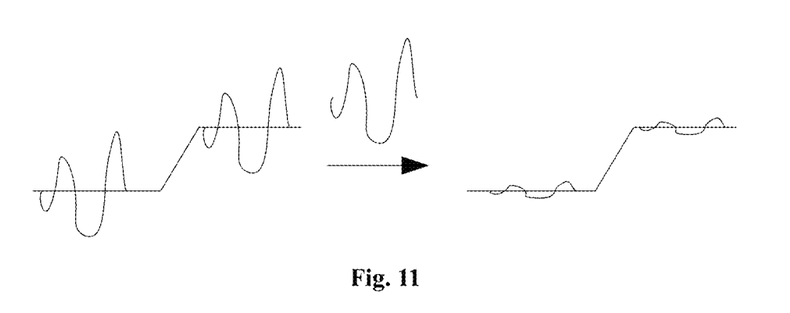
FIG. 11 is a schematic view showing a processing effect of the touch signal according to one embodiment of the present disclosure.

As shown in FIG. 11, in a possible embodiment of the present disclosure, the signal noise may be directly subtracted from the touch signal. Since time sequences of the touch signal and the signal noise are the same, when the signal noise has been subtracted from the touch signal, a useful touch signal may be reserved with the detected signal noise being removed, so it is able to significantly increase the signal-to-noise ratio and improve the quality of the touch signal.

In FIG. 11, a curve on the left represents a signal directly collected by the touch sensor, and a curve on the right represents a signal acquired after the noise reduction. A wave-shaped signal represents the signal noise, and a horizontal waveform signal represents the touch signal. A low level represents a touch-free state, and a high level represents a touch state. It should be appreciated that, a signal directly collected by the touch sensor on the left may include a large signal noise. The signal on the right may be acquired after the noise reduction performed on the touch signal collected by the touch sensor in accordance with the collected signal noise. As shown in FIG. 11, the signal noise has been significantly reduced, and the signal-to-noise ratio has been significantly increased, that is, the quality of the finally-acquired touch signal has been significantly improved.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A display panel, comprising:
    a base substrate;
    a touch sensor arranged on the base substrate and comprising a plurality of touch sub-electrodes; and
    a signal noise sensor configured to detect a signal noise from the display panel and comprising a plurality of noise detection electrodes;
    a plurality of dummy patterns arranged at a same layer as, and made of a same material as, the plurality of noise detection electrodes;
    wherein an outer contour of at least one noise detection electrode is located within an outer contour of at least one touch sub-electrode,
    wherein all of the plurality of noise detection electrodes are electrically connected to each other,
    wherein the plurality of dummy patterns is electrically insulated from each other, and each dummy pattern is electrically insulated from the noise detection electrodes,
    wherein each touch sub-electrode comprises a receiving electrode and a transmitting electrode,
    wherein an extension direction of each bridging line crosses an arrangement direction of the receiving electrode and the transmitting electrode,
    the noise detection electrode and the dummy pattern have a same size and a same shape,
    the noise detection electrodes are arranged directly on both the receiving electrode and the transmitting electrode.

2. The display panel according to claim 1, wherein the plurality of noise detection electrodes is arranged at a same layer as, and electrically insulated from, the plurality of touch sub-electrodes.

3. The display panel according to claim 1, wherein the plurality of noise detection electrodes is arranged at a layer different from, and electrically insulated from, the plurality of touch sub-electrodes.

4. The display panel according to claim 1, wherein when a part of the plurality of noise detection electrodes are electrically connected to each other, the plurality of noise detection electrodes is arranged in at least one region, the noise detection electrodes in each region are electrically connected to each other, and a coverage area of each region is smaller than a coverage area of the plurality of noise detection electrodes.

5. The display panel according to claim 1, wherein the noise detection electrodes are electrically connected to each other through bridging lines, and the bridging lines are arranged at a same layer as, and made of a same material as, the noise detection electrodes.

6. The display panel according to claim 1, further comprising a noise detection signal line, wherein one end of the noise detection signal line is electrically connected to the plurality of noise detection electrodes and the other end of the noise detection signal line is connected to a touch control chip.

7. A display device, comprising the display panel according to claim 1.

8. The display device according to claim 7, further comprising a touch control chip, wherein the touch sensor and the signal noise sensor are electrically connected to the touch control chip, and the touch control chip is configured to perform noise reduction on a detection result of the touch sensor in accordance with a signal noise detected by the signal noise sensor.

9. A touch signal processing method for the display device according to claim 7, comprising:
    acquiring a touch signal collected by a touch sensor and a signal noise collected by a signal noise sensor; and
    performing noise reduction on the touch signal in accordance with the signal noise.

10. A method for manufacturing a display panel, comprising:
    providing a base substrate;
    forming a signal noise sensor on the base substrate, the signal noise sensor being configured to detect a signal noise from the display panel; and
    forming a touch sensor on a same layer as the signal noise sensor, or forming a touch sensor on a side of the signal noise sensor away from the base substrate,
    wherein the display panel comprises a plurality of dummy patterns, the signal noise sensor comprises a plurality of noise detection electrodes, and the forming the signal noise sensor on the base substrate comprises forming the plurality of dummy patterns and the plurality of noise detection electrodes through a single patterning process,
    wherein all of the plurality of noise detection electrodes are electrically connected to each other,
    an outer contour of at least one noise detection electrode is located within an outer contour of at least one touch sub-electrode,
    the plurality of dummy patterns is electrically insulated from each other, and each dummy pattern is electrically insulated from the noise detection electrodes, each touch sub-electrode comprises a receiving electrode and a transmitting electrode, an extension direction of each bridging line crosses an arrangement direction of the receiving electrode and the transmitting electrode, the noise detection electrode and the dummy pattern have a same size and a same shape, the noise detection electrodes are arranged directly on both the receiving electrode and the transmitting electrode.

11. A method for manufacturing a display panel, comprising:

providing a base substrate;

forming a touch sensor on the base substrate; and forming a signal noise sensor on a side of the touch sensor away from the base substrate, wherein the signal noise sensor is configured to detect a signal noise from the display panel, wherein the display panel comprises a plurality of dummy patterns, the signal noise sensor comprises a plurality of noise detection electrodes, and the forming the signal noise sensor on the base substrate comprises forming the plurality of dummy patterns and the plurality of noise detection electrodes through a single patterning process, wherein all of the plurality of noise detection electrodes are electrically connected to each other, an outer contour of at least one noise detection electrode is located within an outer contour of at least one touch sub-electrode, the plurality of dummy patterns is electrically insulated from each other, and each dummy pattern is electrically insulated from the noise detection electrodes, each touch sub-electrode comprises a receiving electrode and a transmitting electrode, an extension direction of each bridging line crosses an arrangement direction of the receiving electrode and the transmitting electrode, the noise detection electrode and the dummy pattern have a same size and a same shape, the noise detection electrodes are arranged directly on both the receiving electrode and the transmitting electrode.

\* \* \* \* \*